US011898271B1

(12) United States Patent
Estevez et al.

(10) Patent No.: US 11,898,271 B1
(45) Date of Patent: Feb. 13, 2024

(54) BORON NITRIDE NANOTUBE FABRIC

(71) Applicant: The United States of America, as represented by the Secretary of the Navy, Arlington, VA (US)

(72) Inventors: Joseph Evans Estevez, Ridgecrest, CA (US); Gretchen Hawes Hefley, Ridgecrest, CA (US); Michael Bernard Celestine, Ridgecrest, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 855 days.

(21) Appl. No.: 16/723,297

(22) Filed: Dec. 20, 2019

Related U.S. Application Data

(60) Provisional application No. 62/782,473, filed on Dec. 20, 2018.

(51) Int. Cl.
*D01D 5/00* (2006.01)
*D06M 11/58* (2006.01)
(Continued)

(52) U.S. Cl.
CPC .............. *D01D 5/003* (2013.01); *D06M 11/58* (2013.01); *B82Y 40/00* (2013.01); *C04B 35/583* (2013.01);
(Continued)

(58) Field of Classification Search
CPC .......... C08L 67/04; C08L 27/12; C08L 29/04; C08L 39/06; C08L 89/06; H10N 30/857; H10N 30/1061; H10N 30/02; H10N 30/077; H10N 30/078; H10N 30/092; H10N 30/098; H10N 30/1051; H10N 30/30; H10N 30/302; H10N 30/852; H10N 30/875; H10N 30/00; H10N 30/85; H10N 30/87; A61L 31/022; A61L 31/10; A61L 31/148; A61L 15/225; A61L 15/26; A61L 15/44; A61L 2300/256; A61L 2300/404; A61L 2300/442; A61L 2300/62; A61L 2400/12; A61L 2420/02; A61L 2420/08; A61L 2430/02; A61L 27/18; A61L 27/24; A61L 27/34; A61L 27/3834; A61L 27/3847; A61L 27/46; A61L 27/52; A61L 27/54; A61L 27/56; A61L 27/58; A61L 31/06; A61L 31/088; A61L 15/22; A61L 27/38; A61L 31/02; A61L 31/14; B29K 2067/046; B29K 2509/00; B29K 2995/0003; B29L 2031/3406; B29L 2031/753; D01D 1/02; D01D 5/003; D01F 6/625; D04H 1/4326;
(Continued)

(56) References Cited

U.S. PATENT DOCUMENTS

2016/0190427 A1* 6/2016 Kim ...................... H01L 41/193
 252/62.9 R
2019/0284423 A1* 9/2019 Bodkhe .................... C08K 3/01

* cited by examiner

*Primary Examiner* — Lynda Salvatore
(74) *Attorney, Agent, or Firm* — Naval Air Warfare Center Weapons Division; Stuart H. Nissim

(57) ABSTRACT

The method of the present invention for making a BNNT fabric comprises dispersing Boron-Nitride nanotubes at loading greater than 5 weight % in an electrospinning delivery solution; electrospinning the delivery solution onto a collector thereby forming a mat comprised of BNNT-PAN nano fibers; and, finally removing any electrospinning delivery solution from the mat leaving a fabric of intertwined Boron-Nitride nanotubes.

11 Claims, 7 Drawing Sheets

(51) Int. Cl.
   *D06M 11/74* (2006.01)
   *D06M 101/32* (2006.01)
   *C04B 35/583* (2006.01)
   *C04B 35/622* (2006.01)
   *B82Y 40/00* (2011.01)

(52) U.S. Cl.
   CPC ....... *C04B 35/62227* (2013.01); *D06M 11/74* (2013.01); *D06M 2101/32* (2013.01)

(58) Field of Classification Search
   CPC .............................. D04H 1/728; A01N 37/36; A61B 2560/0214; A61B 2562/0209; A61B 2562/0247; A61B 2562/0261; A61B 2562/04; A61B 2562/16; A61B 5/03; A61B 5/031; A61B 5/6867; A61B 5/6868; A61B 5/6869; A61B 8/12; A61B 5/00; A61F 2/28; A61F 2/2846; A61F 2/3094; A61F 2002/2821; A61F 2002/2864; A61F 2002/30062; A61F 2002/30087; A61F 2002/30677; A61F 2002/3084; A61F 2002/30971; A61F 2310/00293; A61F 2310/00371; A61F 2310/00982; A61F 2/30; A61M 2037/0023; A61M 2037/0061; A61M 2205/04; A61M 37/0015; A61M 37/0092; A61M 37/00; B06B 1/0696; B06B 1/06; B29C 48/022; B29C 48/08; B29C 48/142; B29C 48/146; B29C 48/267; C08J 2327/16; C08J 3/21; C08K 2003/385; C08K 2201/011; C08K 3/38; D02G 3/02; D02G 3/441; D02G 3/449; D02G 3/44; D03D 15/283; D03D 15/50; D10B 2331/041; D10B 2401/13; G01L 1/16; H02J 50/12; H02J 50/20; H02J 442/189
   USPC ............... 442/189; 623/23.57; 310/338, 345; 252/62.9 R; 600/561; 604/46; 264/465
   See application file for complete search history.

ns. The invention described relates to Boron Nitride Nanotube Fabric. US 11,898,271 B1.

BORON NITRIDE NANOTUBE FABRIC

CROSS-REFERENCE TO RELATED APPLICATIONS

This is a non-provisional application, which claims the benefit of, parent application Ser. No. 62/782,473 filed on Dec. 20, 2018, whereby the entire disclosure of which is incorporated herein by reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to the synthesis and use of Boron-Nitride fibers and fabrics.

DETAILED DESCRIPTION OF EMBODIMENTS OF THE INVENTION

Figure 1:
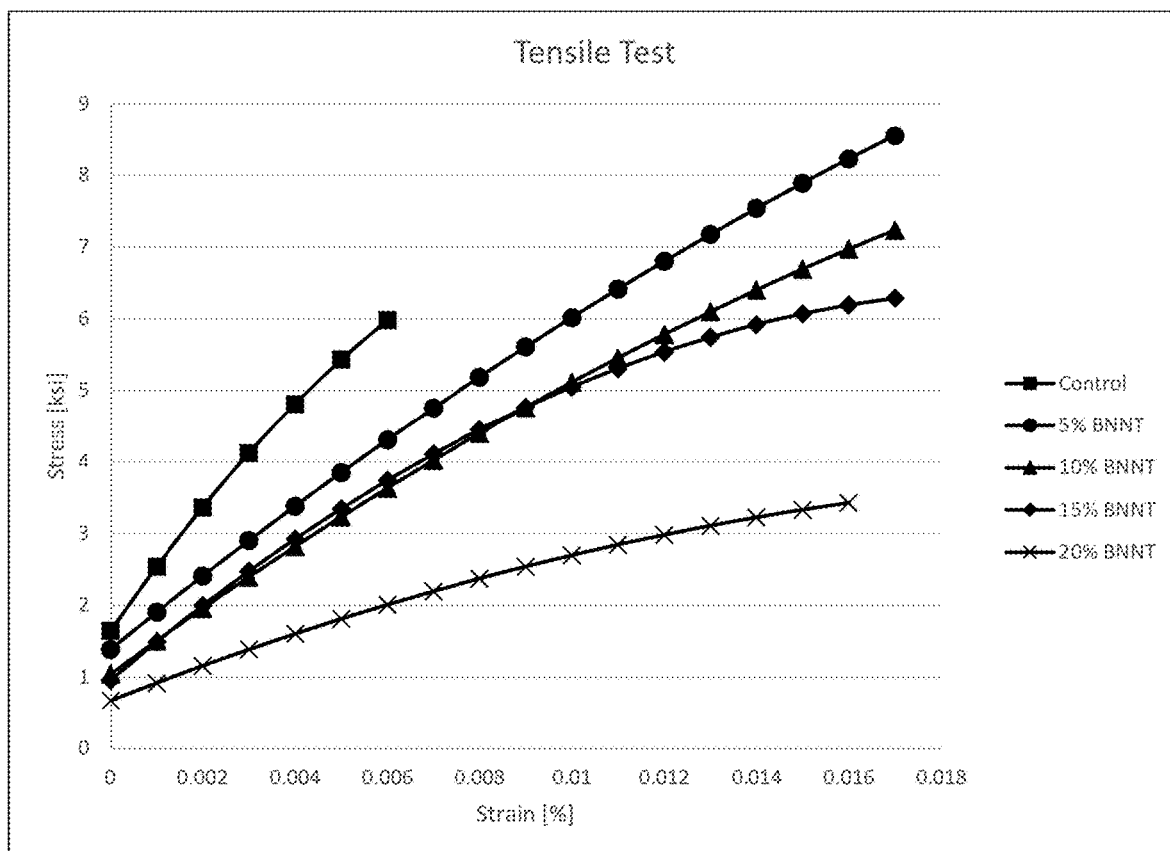
FIG. 1 is a graph of tensile testing comparison according to embodiments of the invention.
Figure 2:
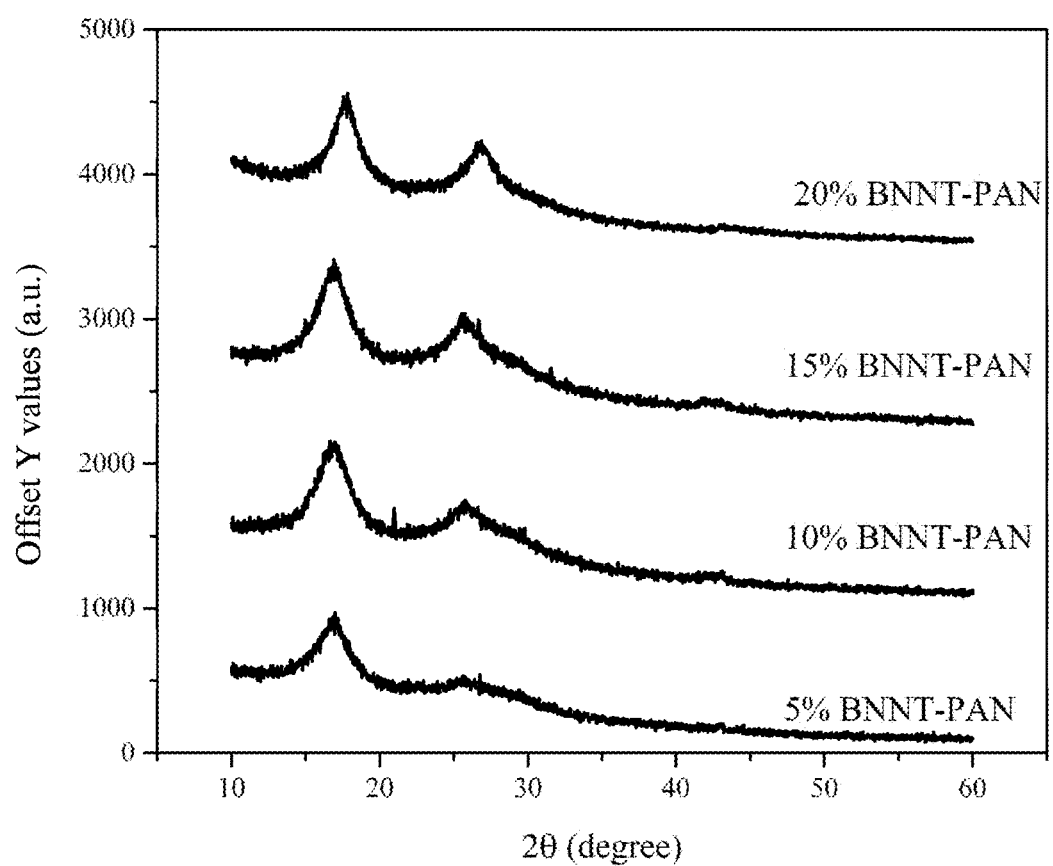
FIG. 2 is a graph of an XRD of various BNNT-PAN electrospun fibers according to embodiments of the invention.
Figure 3:
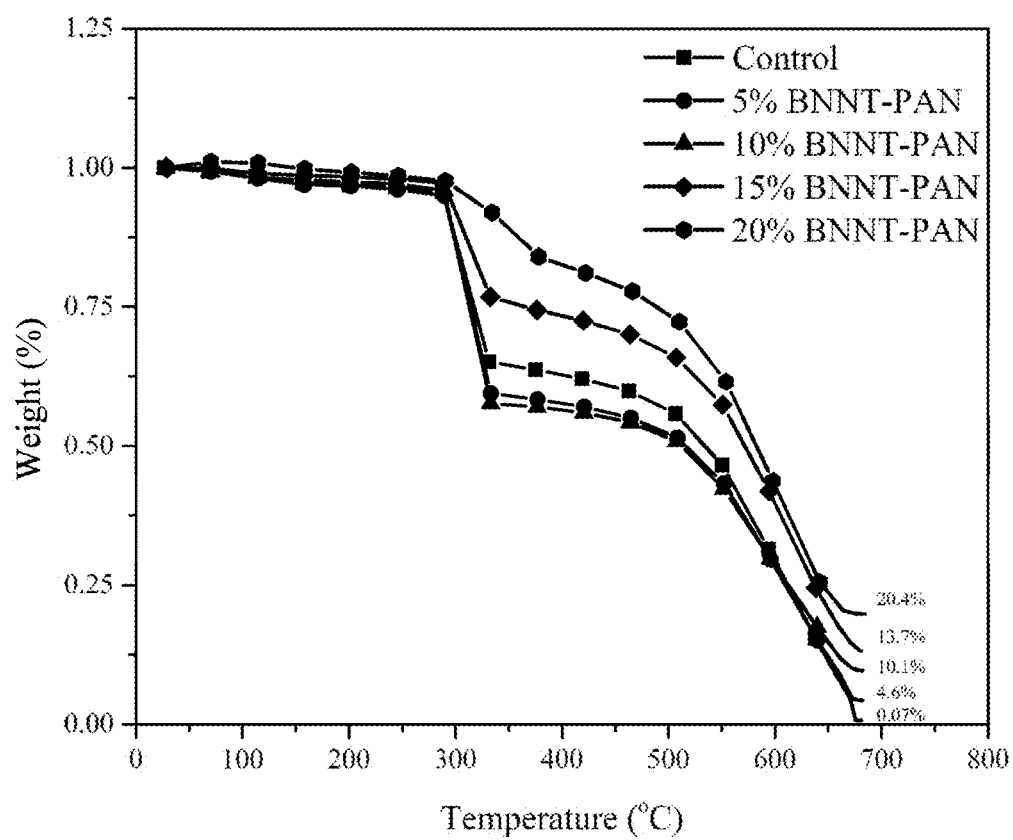
FIG. 3 is a graph of the TGA of various BNNT-PAN electrospun fibers confirming an increase in BNNT content with increasing BNNT loading according to embodiments of the invention.
Figure 4:
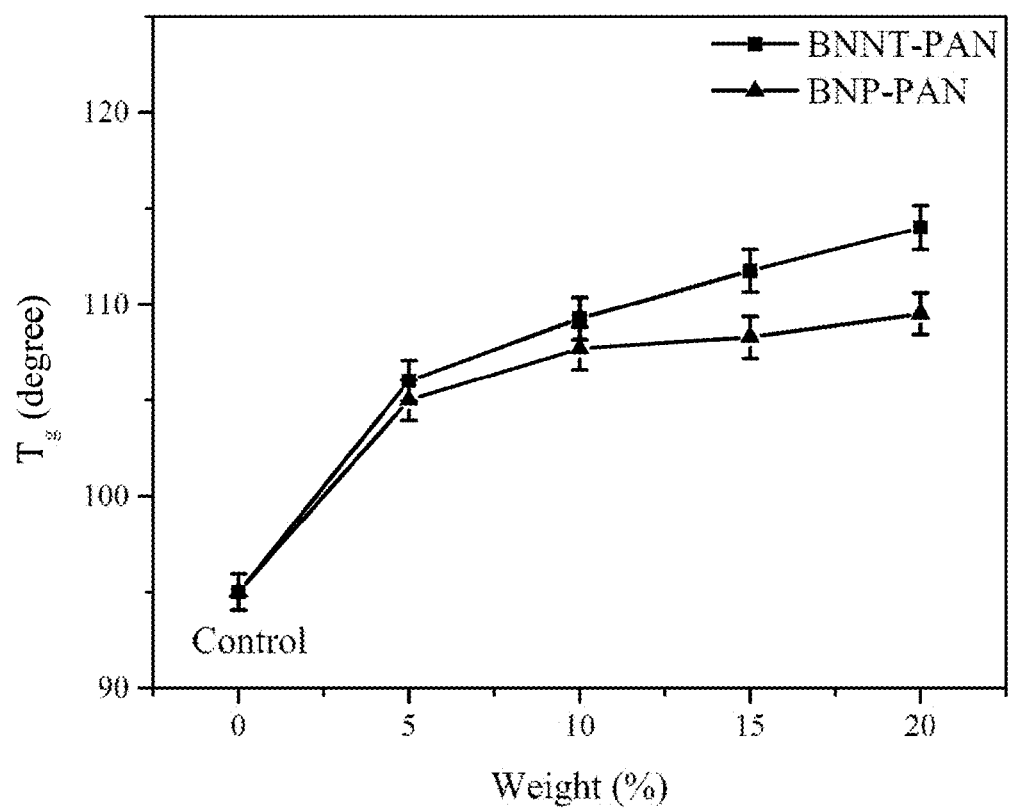
FIG. 4 is a graph showing the thermal and mechanical behavior of BNNT-PAN and BNP-PAN electrospun fibers as a function of loading according to embodiments of the invention.
Figure 5A:
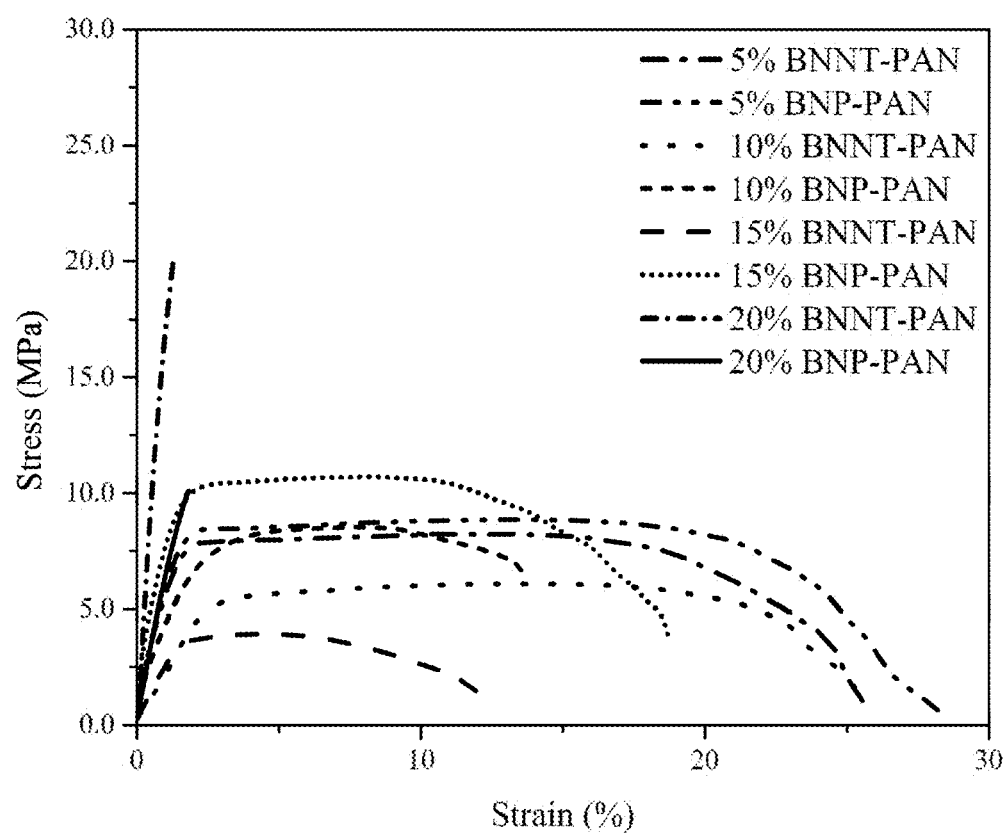
FIG. 5*a* is a graph of DMA of various BNNT-PAN and BNP-PAN electrospun fibers as a function of loading according to embodiments of the invention
Figure 5B:
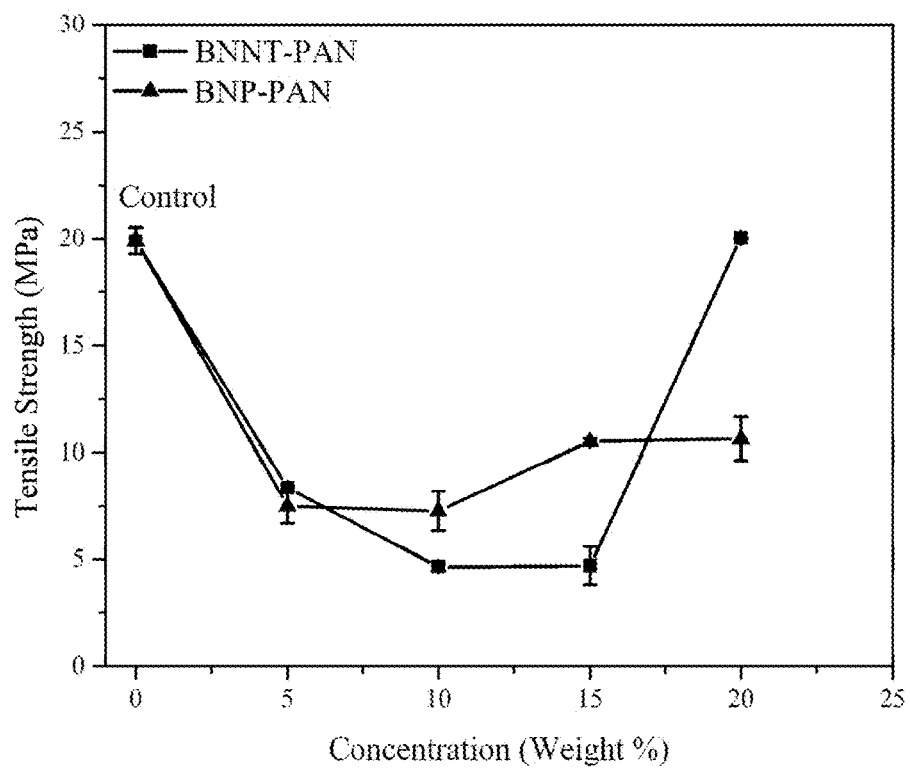
FIG. 5*b* is a graph of tensile strength of various BNNT-PAN and BNP-PAN electrospun fibers as a function of loading according to embodiments of the invention
Figure 6:
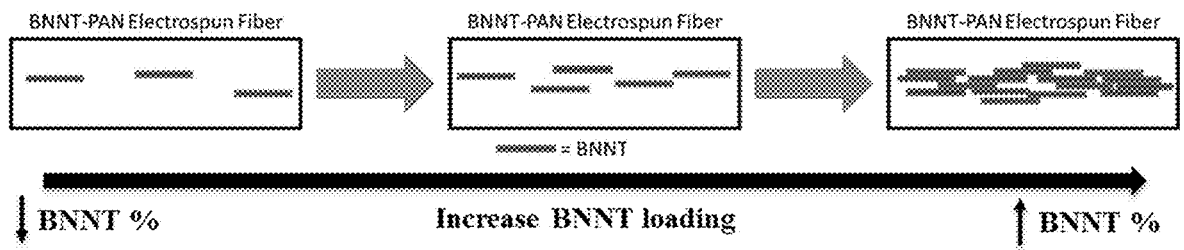
FIG. 6 is an illustration of BNNT-PAN electrospun fibers at different BNNT loading according to embodiments of the invention.
Figure 7:
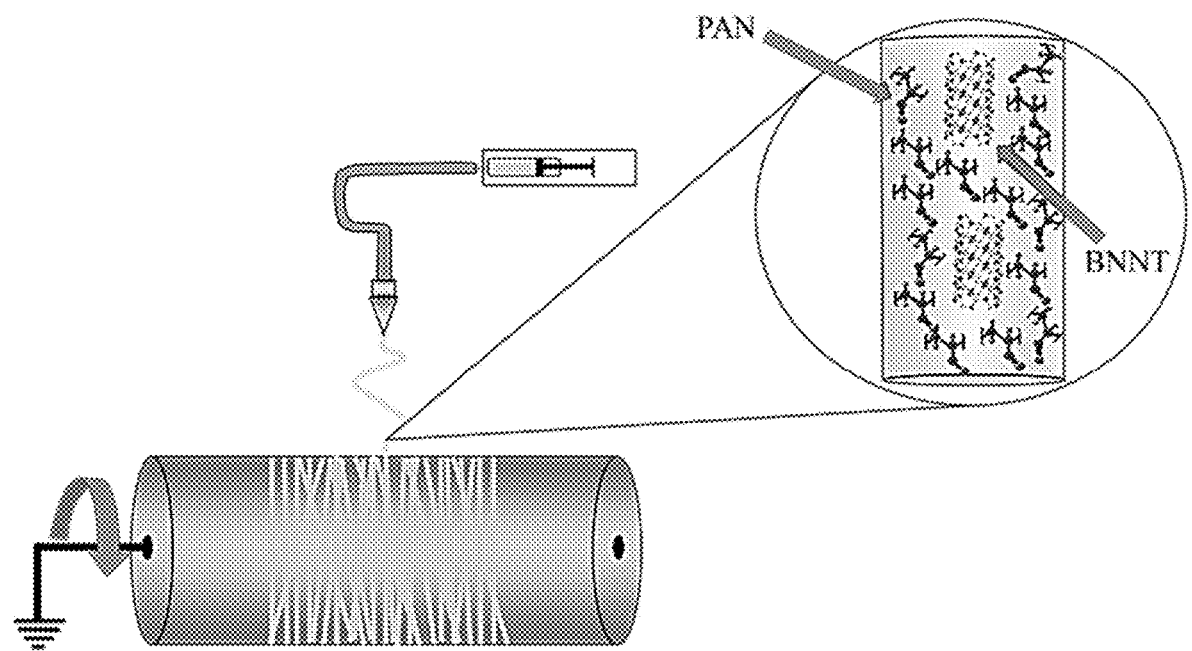
FIG. 7 is an illustration of the electrospinning process according to embodiments of the invention.
Figure 8:
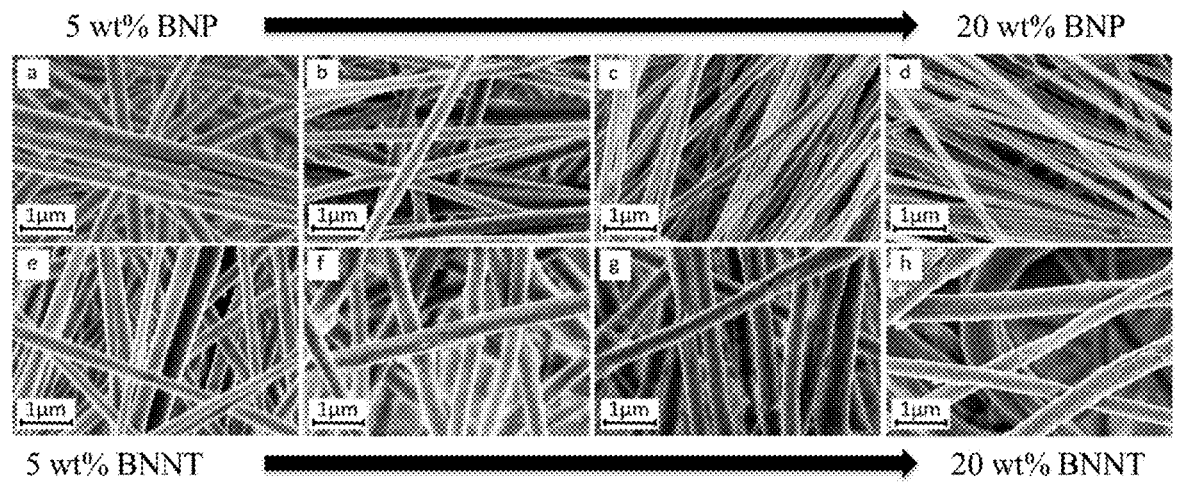
FIG. 8 is a photograph of electrospun fiber morphology with respect to BNP (Top) and BNNT (Bottom) wt. % loading according to embodiments of the invention.

Although embodiments of the invention are described in considerable detail, including references to certain versions thereof, other versions are possible. Therefore, the spirit and scope of the appended claims should not be limited to the description of versions included herein.

Where a range of values is provided, it is understood that each intervening value, to the tenth of the unit of the lower limit unless the context clearly disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Embodiments of the invention generally relate to Boron-nitride fibers, fabrics, and their production.

Boron Nitride (BN) is a binary compound that is made up of group III and V elements but closely resembles the bonding and structural orientation of Carbon Nanotubes (CNTs). Boron nitride nanotubes (BNNTs) are similar in structure to CNTs with nearly identical lattice parameters, bond angles and bond spacing. Its close resemblance to this carbon system is due to the properties, polymorphism similarities and structure of BN. The B—N bond possesses a local dipole moment that is due to the difference in electro-negativity between the Boron and Nitrogen atoms. This gives the covalent bond between Boron and Nitrogen a significant ionic component. BNNTs are isoelectronic, having a band gap of ~6.0 eV and is independent of chirality. All BNNTs emit in the violet to ultraviolet range and have one strong Raman active phonon mode at 1370 cm-1. Mechanically, BNNTs are similar to CNTs and have superb mechanical properties, but BNNTs have a slightly lower predicted Young's Modulus of 0.7 to 0.9 TPa. However, BNNTs have a higher chemical resistance of ~900° C. in air and a high thermal conductivity of 600 W/mK.

Recent advancements in their synthesis methods have made BNNTs viable in applications, such as armor, thin coatings, high performance batteries, aerospace components, ceramic composites, medicine, lightweight wiring, radiation shielding, piezoelectric applications, fire retardant cabling, water filtration, UV shielding, enhanced sensors, energy harvesting, and enhanced cooling of electronic components.

Challenges arise when attempting to incorporate nanomaterials into systems or to construct devices because of the inability to create uniform dispersions or to align the nanomaterial into a specified geometry. In literature it is typical to see doping of a material system with 5% or less of a nanomaterial; however, achieving doping greater than 5% is difficult due to the high surface energy associated with nanomaterials and the inability to break up agglomerations and create homogeneous dispersions. The BN fabric of the present invention utilizes several mixing methods for loading an electrospinning solution with greater than 5% by weight of the BN. Electrospinning parameters were then tested and established and a consistent mat of electrospun fibers impregnated with greater than 5% by weight BN was generated. After removal of the electrospinning solution from the mat, using chemical or thermal treatments, a tangled network of BN nanotubes was left behind creating the BN fabric. This BN fabric is a novel, first generation material and presents the unique opportunity to capitalize on the properties of the BN to create smart skins, thermal resistant coatings, ultra-high temperature composites, water filtration membranes, piezoelectric energy harvesting fabrics, sensors, radiation shielding, hydrogen storage, chemical resistant coatings, and more.

The present invention employs two forms of nanoscale Boron Nitride (BN). Boron Nitride Powder (BNP) and Boron Nitride Nanotubes (BNNTs). BNP was more easily processed due to its lower surface area per volume, but lacks some of the more advantageous qualities that BNNTs possess. BNP was used to develop the present method used to make BN fabrics. After a preferred process was developed and refined, the BNNTs were incorporated into the process.

The method of the present invention for making a BNNT fabric comprises dispersing Boron-Nitride nanopaxticles in an electrospinning delivery solution; electrospinning the delivery solution onto a collector thereby forming a mat comprised of Boron-Nitride nano fibers; and, finally removing any electrospinning delivery solution from the mat.

Dispersing BNNTs within a carrier solvent or sol-gel electrospinning solution preferably utilizes acoustic mixing, sonication, mechanical stirring, or various combinations thereof.

If the Boron-Nitride is first dispersed in a carrier solvent, a polymer system comprising at least one polymer is then mixed in to then generate a sol-gel electrospinning solution for the BN/polymer electrospinning delivery solution.

The BN/polymer electrospinning delivery solution is then electrospun onto a collector, for example, a flat table or platform, drum, disk, or the like, thereby forming a mat of electrospun nano fibers.

Any remaining solvent and the polymer portion of the electrospun nanofibers is then removed via chemical or thermal methods to leave behind a tangled network of BNNTs.

In preferred embodiments, BNNTs are dispersed in either the sal-gel electrospinning solution or the carrier solvent. Mixing methods for dispersion include, but are not limited to, acoustic, sonication, or mechanical mixing which can be used in any order, and in combination, as necessary to break up agglomerations and homogeneously disperse the BNNTs within the sol-gel electrospinning solution or the carrier solvent.

Acoustic mixing methods can be tailored to have a mixing profile that mixes the material at various frequencies for various amounts of time. In addition, material quantities can be added slowly to further aid in the breakup of agglomerations and homogeneous dispersion of the material with the carrier solvent or sol-gel solution.

Preferred BNNT concentrations are greater than 5% by weight relative to the polymer concentration within the solvent. The concentration of BNNTs within the solution plays a role in the overall properties of the resulting BNNT fabric and can be adjusted to tailor the properties of the BNNT fabric for specific applications. In embodiments, functionalized or non-functionalized BNNTs can be used.

When BNNTs were first dispersed in the carrier solvent, a preferred polymer is compatible with the carrier solvent. The polymer is then dissolved within the carrier solvent with the BNNTs to fabricate a solgel solution. It is important to observe and maintain dispersion of the nanomaterial during synthesis of the solgel solution. Additional mixing may be required depending on the polymer system.

Preferred polymers for the polymer system can be selected based upon the specific application requirements. Examples of suitable polymers include, but are not limited to, Asphaltene, bis-(UPy-U)-poly(e-eaprolactone), Carboxylmethyl Chitosan (degree of substitution=0.65), Cellulose Acetate, Chitin from crab shells [degree of deacetylation (DD): 9%], Chitosan My 210,000; 0.78 deacetylation, Collagen Type I, Collagen Type III, Epoxy 609, Ethylene-propylene-diene with 5-ethylidene-2-norborene as a diene, Fibrinogen Fraction. 1, Gelatin Type A, Hemoglobin, Hyaluronic Acid, Lecithin, Myoglobin, Nylon 6,66,1010, Pellethane 2363-80A (degradable polyetherurethane), Phenoxy, (Polyhydroxyether of bisphenol A), Poly (2-methacryloyloxyethyl phosphorylcholine), Poly(2,6-dimethyl-1,4-phenylene oxide), Poly(2-hydroxyethyl methacrylate), Poly(3 hydroxybutyrate-co-3-hydroxyvalerate), Poly(3-hydroxybutyrate), Poly(acrylonitrile-co-2-hydroxyethyl methacrylate), Poly(acrylonitrile-co-glycidyl methacrylate), Poly (D,L-lactide-co-trimethylene carbonate), Poly(D,L-lactide)-poly(ethylene glycol), Poly(dimethylsiloxane-b-vinyl pyrrolidone), poly(ethylene-co-vinyl alcohol) with 44% ethylene, Poly(L-glutamic acid 4-co-L-tyrosine), Poly(L-lactic acid)-co-(caprolactone), Poly(L-lactic acid)-co-(glycolic acid), Poly(L-ornithine), Poly(methyl methacrylate) (PMMA), Poly(o-methoxyaniline), Poly(p-phenylene vinylene), Poly(propylene carbonate), Poly(styrene-co-acrylamide), Poly(styrene-co-methacrylic acid), mole ratio of 5:1 and 10:1, Poly(styrene-co-p-sodium styrene sulphonate), poly(vinylidene fluoride-co-hexafluoropropylene) (PVDF-co-HFP), poly(vinylidene fluoride-co-trifluoroethylene) (PVDF-co-HFP), Poly(γ-stearyl-L-glutamate), Poly-L-lactide 1.09 dL, Poly-N-isopropyl acrylarnide, Poly-N-isopropylacrylamide-co-acrylamide-co-vinylpyrrolidone, Poly-galanino ethylester)0.67 (glycino ethyl ester)0.33 phosphazene], Polyacrylic acid (PAA), Polyacrylonitrile (PAN), Polyamic acid (precursor to polyimide), Polyamide 4,6, Polyamide 6, Polyamide 612, Polybutylene terephthalate, Polycaprolactone, Polycarbonate (PC), Polydioxanone (PDS II from Ethicon, Inc.), Polyetherimide, Polyetherketone cardo, Polyethersulfone, Polyethylene glycol, 50 kDa, Polyethylene terephthalate (PET), Polyethylene-co-vinyl alcohol, Polyglycolide, Polypyrrole [(PPy3)+(DEHS)-]x, Polystyrene (PS), Polysulfone (PSU), Polyurethane (PU), Polyvinyl acetate (PVAc), Polyvinyl alcohol (PVA), Polyvinyl butyral, Polyvinyl chloride (PVC), Polyvinyl phenol, Polyvinyl pyrrolidone (PVP), Polyvinylidene fluoride (PVDF), Starch (Natural Tapioca), Thermoplastic Polyurethane (TPU), and the like.

Preferred carrier solvents can be selected based upon the specific application requirements. Examples of suitable carrier solvents include, but are not limited to, Toluene, 1,1,1,3,3,3-hexafluoro-2-propanol, 70% Trifluoroacetic acid, 30% Methylene Chloride, trifluoroacetic acid, 1,1,1,3,3,3 hexafluoro-2-propanol, 70% Trifluoroacetic acid, 30% Methylene Chloride, 1,1,1,3,3,3 hexafluoro-2-propanol, 2,2,2-trifluoroethanol, PBS (20x): ethanol (1:1) v/v, 1,1,1,3,3,3 hexafluoro-2-propanol, Butanone+propylene glycol monomethyl ether (3:1, v/v), tetrahydrofuran and cyclohexane, 1,1,13,3,3 hexafluoro-2-propanol, 2,2,2-trifluoroethanol, 2,2,2-trifluoroethanol, NH4ORN,N-dimethyl formamide (2:1), 70% Chloroform, 30% N,N Dimethylformamide, 2,2,2-trifluoroethanol, 2,2,2 trifluoroethanol, 1,1,1,3,3,3-hexafluoro-2-propanol, Dimethylformamide (DMF) tetrahydrofuran (THF), 30/70, Ethanol, N,N-dimethylformamide, Ethanol, Chloroform, Chloroform, N,N-dimethylformamide, N,N-dimethylformamide, Dichloromethane: N,N, dimethyl formamide (70:30 Tetrahydrofuran, Chloroform, Dimethyl formamide, Water, N,N dimethyl formamide: dichloromethane (70:30 wt:wt), 1,1,1,3,3,3-hexafluoro-2-propanol, Water, Tetrahydrofuran: N,N-dimethylformamide (1:1), tetrahydrofuran (THF)/dimethylformamide (DMF) (50:50 v/v), Deionized water, Chloroform, N,N-Dimethylformamide: Tetrahydrofizan (4:1 v/v), N,N-Dimethylformamide: Tetrahydrofuran (4:1 v/v), N,N-Dimethylformamide: Tetrahydrofuran (4:1 v/v), Acetone and N,N-dimethylacetamide (7/3, w/w), dimethylformamide/acetone (3:2, v/v), Chloroform, 1,1,1,3,3,3-hexafluoro-2-propanol, Tetrahydroduran, Deionized water, N,N-dimethylformamide, N,N-dimethylacetamide, Formic acid: Acetic acid (1:1), Formic acid, Trifluoroacetic acid, 90% chloroform/10% methanol, N,N Dimethyl formamide:

tetrahydrofuran (1:1), 1,1,1,3,3,3 hexafluoro-2-propanol, Dimethylacetamide: tetrahydrofuran (1:1), N,N-dimethylformamide, N,N-Dimethyl formamide, water, 50% Trifluoroacetic acid: 50% Methylene chloride, Isopropyl alcohol/water (80:20), 1,1,1,3,3,3 hexafluoro-2-propanol, N,N-dimethyl formamide, N,N-Dimethylformamide: Tetrahydrofuran (4:1 v/v), N,N-dimethylformamide, N,N Dimethyl formamide, Methylene chloride (MC), Tetrahydrofuran Dimethylsulfoxide (8:2), Tetrahydrofuran: N,N-dimethylformamide (1:1), Tetrahydrofuran, Ethanol, N,N-dimethyl acetamide, hexafluoroisopropanol, and the like.

The sol-gel solution is then electrospun onto a collector, which can be of various geometries or designs. The collector chosen can influence the orientation of the electrospun fibers and the overall material properties of the BNNT fabric.

During electrospinning, a stable Taylor cone must be established and nanofibers must be generated.

Electrospinning parameters are employed to control the physical properties of the electrospun fibers, including for example, length, diameter, surface morphology, thickness, etc., which influence the overall material properties of the BNNT fabric. Electrospinning parameters include but are not limited to voltage, humidity within the chamber, distance from collector and spinneret, feed rate, air velocity, motion and size of collector, needle gauge, etc.

After successful generation of the electrospun fiber mat, the mat is removed from the collector and can be stored until removal of the polymers can be performed.

The polymers can be removed via chemical or thermal methods. The removal of the polymers allows the BNNTs to tangle and to form the BNNT fabric.

When chemical removal methods were employed, the chemical must only degrade the polymer so as not to compromise the integrity of the BNNT fabric. In addition, once polymer removal is completed, washing methods must be implemented to remove the polymer-removing chemical.

When thermal removal methods were employed, a temperature sufficiently high enough to burn off the polymer must be chosen. It is also possible to heat and degrade the polymer at various temperatures creating a pyrolysis profile. The temperature and pyrolysis profile influences the material properties of the resulting BNNT fabric and can be used to tailor the material properties to a specific application.

Tension can also be employed during the polymer removal process to orient the BNNTs within the BNNT fabric for directional material properties.

BNP with a preferred particle size between 50-100 nm was used for the BNP products and processes of the present invention. A preferred polymeric delivery system, which is used as a carrier for the BNP during electrospinning, was poly(acrylonitrile) (PAN) powder dissolved in dimethylformamide (DMF). In one preferred polymeric delivery system, the solution comprised 10% PAN. The BNP was added incrementally with mixing until the desired weight percentage of BNP was achieved in the polymeric delivery system solution. This incremental addition ensured that the BNP was sufficiently integrated into the PAN-DMF so that the solution was homogeneous.

Because high loading of the BNP was desirable, several mixing techniques were implemented at different stages of the BNP loading, including mechanical mixing, sonication, and resonant mixing. Integration of the BNP into solution could be thought of as loading applied to the mixture to eventually achieve homogeneity as the BNP particles were broken up and dispersed. Mechanical mixing imparted low loading to the solution, sonication slightly higher loading, and resonant mixing considerably higher loading. Low loading was beneficial for initial wetting of the BNP with the PAN-DMF solution. Medium loading was implemented to improve homogeneity once the majority of the BNP was wetted. High loading was required to break up particles in high particle weight percentages. This mixing process was very important in that it allowed for a resulting mixture loading of up to 50 weight % BNP into the solution. In all, five solutions were created with the following weights percent of BNP: 5, 10, 15, 20, and 50%.

After the BNP was integrated into the PAN-DMF, it was possible to electrospin the material. Electrospinning is a process by which high voltages are used to charge a polymeric material and draw the material into thin fibers that are applied to a collector. The electrospinning process is advantageous for the manufacture of nanoscale. BN fabrics because the fibers themselves are nanoscale, such that they preserve the enhanced qualities of BNP over bulk BN. The liquid solution is placed into a syringe connected to a spinneret from which the fibers are drawn out. This enables a constant feed of the material onto the collector, which is imperative for a homogeneous fabric. The nano particles are applied to the collector via a Taylor cone, which is a conical structure of charged particles and which can be observed at the end of the spinneret and extending down to the collector surface. A consistent, robust Taylor cone is an indication of good material application onto the collector. The electrospinning system used was a Narion-01A by MECC.

There were many different electrospinning variables that contributed to the quality of the BN fabric. The feed rate of the syringe had to be optimized for the viscosity of the material. A feed rate that is too high would cause the material to leak from the spinneret, creating lumps in the BN fabric. Too low of a feed rate would starve the system of fiber, creating erratic application of the material to the collector. The charge voltage for electrospinning had to be set such that it was not too high-causing inconsistent fiber application to the collector- or too low-causing an inconsistent Taylor cone or material dripping out of the spinneret. The appropriate charge voltage was observed to be related to the material viscosity and conductivity, and the conductivity of the substrate on the collector. The substrates utilized for the current examples included Teflon fabric, aluminum foil, and carbon nanotube (CNT) sheets. A Teflon substrate resulted in facile removal of the BN fabric sheets, but application of the material to the collector was challenging due to Teflon's low electrical conductivity. Conversely, the aluminum foil's conductivity made it an easy substrate to apply the material to, but separating the BN fabric from the foil without damaging it was difficult. CNT sheets were used with the intention of integrating the BNP into a composite with them and could not be feasibly separated from the BN fabric after application. While conductive, the CNT sheets lacked the conductivity of the aluminum foil and therefore there was some difficulty in effectively applying the material to them, but still easier to achieve than for the Teflon. The speed of the spinneret as it moved along above the surface of the collector was also important-too slow could result in an inconsistent fabric surface, but too fast could be a detriment to the fibers aligning in one direction. The type of collector also affected the alignment of the fibers. It was determined that a rotating drum facilitated fiber alignment better than a plate collector did. Fiber alignment would be important for good composite design and for improved piezoelectric effects from the BN. With the implementation of the rotating drum another variable was added: the speed of rotation. Too slow of a rotation speed did not improve fiber alignment, but too fast a rotation speed caused turbulent flow in the electrospinning chamber, which caused the high aspect-ratio fibers to float and land randomly in the chamber. The electrospinning process further demonstrated the importance of a homogeneous solution, which was imperative to avoid clogging of the spinneret and an uneven fabric surface.

BNNTs (a mixture of single- and multi-walled tubes) were procured from BNNT, LLC, with a reported purity of 50%. Most tubes contained 2-3 walls and had diameters less than 10 nm. BNNTs were purified by oxidizing less thermally stable BN species, washing with hot water, and then drying before incorporation into the electrospinning solutions.

PAN powder, average molecular weight of 150,000, and 99.9% N, N-dimethylformamide (DMF) were both sourced from Millipore Sigma and used as received. Electrospinning solutions consisted of 10 wt. % PAN and 5, 10, 15, and 20 wt. % BN nanomaterial with respect to PAN. Several solution compositions were made. See Table 1.

TABLE 1

BN electrospinning solutions

|  | DMF (g) | PAN (g) | BNNT (g) |
|---|---|---|---|
| 5% BNNT | 31.5 | 3.5 | 0.19 |
| 10% BNNT | 31.5 | 3.5 | 0.39 |
| 15% BNNT | 31.5 | 3.5 | 0.62 |
| 20% BNNT | 31.5 | 3.5 | 0.88 |

Several mixing techniques were implemented at different stages of the BN loading, including mechanical mixing, sonication, and resonant mixing. Integration of BNs into solution is essentially loading applied to the mixture to eventually achieve homogeneity as the particles are deagglomerated and dispersed. In this work, mechanical mixing was used to impart low loading over 24 hours with a magnetic stir bar, while sonication increased the loading and was applied over a shorter timeframe (~12 hours) with a sonication bath. Resonant acoustic mixing afforded considerably higher loading than conventional methods in short intense bursts (1-3 minutes) with a Resodyn II from Resodyn Acoustic Mixers. The BNP and BNNTs were added incrementally during the mixing process until the desired weight percentage of BN was achieved in the solution. This incremental addition ensured that the BNPs and BNNTs were sufficiently dispersed into the PAN-DMF so that the solution was homogeneous. Magnetic stirring was beneficial for initial wetting of the BNP with the PAN-DMF solution. Sonication improved the homogeneity of the mixture, and resonant acoustic mixing was required to break up agglomerates in mixtures with high particle loadings (up to 20%). Solutions were observed to remain homogeneously dispersed for a minimum of 7 days.

The mixing was broken into stages and mixing profile designed based on operators' experience and the observations of the BNNT/BNP mixtures. High g-load mixing is accomplished using a resonant acoustic mixer, which operates by shaking a mix vessel containing material at its resonant frequency. The mixer constantly adjusts the vibration frequency to account for the kinetic and potential energy of the entire mixer-material system to maintain resonance at all times. In this manner, the energy available from the excitation of the system at resonant frequency can be channeled into mixing the material. Unlike a sonication mixer, which vibrates at a very high frequency but with very little displacement, the resonant acoustic mixer achieves relatively high displacement at its lower resonant frequency. This results in the ability to mix at forcing energy as high as 100 g's. This method of mixing is particularly valuable for breaking up agglomerates of BN into single units of either BNNTs or BNP at high concentrations of BN. Depending on the desired finish concentration and the type of BN used, the constituents for electrospinning (PAN-DMF and BN), are added to the mixing container all at once or in metered stages. Initially, low loading for short periods of time is used to ensure the BN is adequately wetted. After the BN has been partially incorporated into the PAN-DMF, breaking up the particles becomes the emphasis of the mix. From here, a mixing cycle is designed in which the forcing energy is varied between 10 g's and 100 g's for set periods of time, with the majority of the mixing time typically spent between 50 g's and 80 g's. The surface chemistry and surface area of the BN being incorporated along with the concentration demand that each configuration (defined as BN type plus desired wt. %) employ slightly different mixing profiles. Checks are performed periodically between mix cycles to note consistency of the solution and to allow the sol-gel solution to cool between cycles. The frequency of the consistency checks are based on experience with the BNNT/BNP mixtures, where the temperatures do not ever exceed limits of the DMF in the mixing time intervals.

The electrospinning system used for preparation of the fibers was a Nanon-01A by MECC. The BNP or BNNT sol-gel electrospinning solutions were placed into a syringe and then placed into a syringe pump. Tubing was fed from the syringe and connected to a spinneret, which was biased to 15 kV by a high voltage power supply. The feed rate was set to 1.0 mL/h to enable a constant feed to the spinneret. The formation of a stable Taylor cone ensured quality deposition of the BN-loaded polymeric nanofiber. The collector plate was a rotating drum spun at 500 rotations per minute and covered in Teflon for easy release of the electrospun nanofiber mats. Electrospinning was performed for 8 hours in which the dispersion remained stable throughout spinning. FIG. 1 depicts the electrospinning setup as described above. Lifetime of sol-gel stability after dispersion was not measured beyond a week; however, BNNTs qualitatively appeared to remain in stable dispersion longer than BNPs.

TABLE 2

Electrospinning parameters

| Electrospinning | Parameters |
|---|---|
| Voltage | 15 kV |
| Feedrate | 0.5 ml/hr |
| Height of Spinneret | 65 mm |
| RPM | 500 |
| Time | 8 hours |
| Spinneret Tip gauge | 24 |
| Temperature | 70° F. |

See FIG. 12 for an illustration depicting the electrospinning setup and the process of PAN cross-linking and interacting with embedded BNNTs.

TABLE 3

BN-PAN electrospun fiber diameters in relation to wt.% loading of BNPs/BNNTs

| Weight % of BN Nanofiller | BNP-PAN Diameter (nm) | BNNT-PAN Diameter (nm) |
|---|---|---|
| 5 | 347 ± 36 | 248 ± 65 |
| 10 | 277 ± 32 | 395 ± 30 |
| 15 | 202 ± 29 | 386 ± 47 |
| 20 | 143 ± 6 | 355 ± 61 |

A preferred pyrolysis procedure for removing polymer(s) from the mat comprises: cut sample dimensions from bulk electrospun mat. (to determine sample BNNT fabric dimensions);
- weigh sample (to verify removal of the organic/polymer);
- place sample between two pieces of fused silica (used as a sample holder for the furnace);
- place in furnace under air atmosphere (in air to ensure that the organic is degraded);
- ramp temperature 10° C./min to a minimum of 700° C. (ramping does not play a significant role in final product and thus was determined by the furnace limits);
- hold 700° C. for 60 minutes (hold time determines the amount of organic that remains and can be extended to purify the BNNT fabric and remove residual organic trapped between the BNNTs);
- allow to cool to room temperature before removing from the furnace (cooling happens under ambient conditions and not with any cooling aids. This allows for material to relax and remove any residual stress).

TABLE 4

| Experimental | Initial Weight before pyrolysis (g) | Weight after pyrolysis (g) |
|---|---|---|
| 5% BNNT | 3.67 | 0.17 |
| 10% BNNT | 5.2 | 0.52 |
| 15% BNNT | 2.82 | 0.37 |
| 20% BNNT | 2.27 | 0.46 |

Composites made from the BNP-PAN electrospun fibers on a CNT substrate were fabricated. The CNTs were from Nanocomp. Each CNT substrate plus BNP-PAN electrospun fibers constituted a layer, and 4 layers were stacked with the fibers in the BN sheet aligned in the same direction. The fibers in the CNT sheet were anisotropic. Epoxy was then poured onto the layers and allowed to soak in. The epoxy used was Lonza Primaset LeCy cyanate ester resin for high-temperature composites. To compare the effect of the BNP-PAN electrospun fibers, two control composites were also fabricated: one with 4 CNT sheets and epoxy, and one with 4 CNT sheets onto which PAN fibers had been electrospun. The composites were placed under vacuum and initially cured for 2 hours at 150° C. before being cured at 210° C. for an additional 24 hours.

The cured composites were cut into 3" by 1" strips lengthwise with respect to the fiber direction of the BNP-PAN electrospun fibers for tensile testing. The test apparatus was the Instron 5884. The samples were pulled lengthwise at 2 inches per minute until fracture. The following results show the average of the tensile testing from these samples, Preliminary tensile testing was performed on CNT sheet composites consisting of 4 plys and LeCy resin. Electrospun fibers with and without boron nitride were also incorporated to see the effect of the fiber on the tensile strength of the composite. Electrospun fibers were randomly orientated and a 20% by weight of boron nitride nanoparticles were incorporated into the fibers. Referring to FIG. 1, the composites with electrospun fiber did not have a noticeable weight or thickness change. However, improved fracture toughness was observed for all CNT composites with electrospun fiber. In addition, it is important to note that adding boron nitride nanoparticles had no degradation effects on the electrospun fiber.

While the PAN initially shows a higher stress with respect to strain (a function of the test apparatus), the slope of the PAN curve is less than the slope of the CNT curve, indicating that the CNT samples were stiffer than the PAN samples. The PAN samples had the largest tensile strains of the three types of composites, which again, is reasonable based on the material composition. The data indicates that the BNP improves both the stiffness and tensile strength of the CNT composite.

Stability increases with increased BNNT weight %. BNNT composite made from 4 plys of 20% BNNT-PAN electrospun fiber converted to BNNT fabric.

Hot pressing multiple sheets of >5% BNNT-PAN fibers increases stability at all weight percentage.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method for making a Boron-Nitride nanofiber fabric comprising:
   - dispersing Boron-Nitride nanoparticles in an electrospinning delivery solution;
   - electrospinning the delivery solution onto a collector thereby forming a mat comprised of Boron-Nitride nano fibers; and,
   - removing all electrospinning delivery solution from the mat leaving a mat consisting of Boron-Nitride nano fibers.

2. The method of claim 1 wherein said electrospinning delivery solution comprises at least one carrier solvent and at least one polymer.

3. The method of claim 2 wherein said Boron-Nitride nanoparticles comprise at least 5% by weight relative to the polymer concentration within the electrospinning delivery solution.

4. The method of claim 2 wherein said Boron-Nitride nanoparticles comprise between about 5 weight % and 50 weight % relative to the polymer concentration within the electrospinning delivery solution.

5. The method of claim 4 wherein said at least one polymer comprises poly(acrylonitrile).

6. The method of claim 4 wherein said at least one carrier solvent comprises dimethylformamide.

7. The method of claim 1 wherein removing any electrospinning delivery solution from the mat comprises removal chemically or thermally.

8. The method of claim 1 wherein said Boron-Nitride nanoparticles are dispersed in the electrospinning delivery solution using a mixing method selected from acoustic mixing, sonication, mechanical mixing, or combinations thereof, wherein said mixing method breaks up any agglomerations of nanoparticles present and homogeneously disperses the nanoparticles within the electrospinning delivery solution.

9. The method of claim 1 wherein said collector is a flat table, a drum, or a disk.

10. The method of claim 1 wherein said Boron-Nitride nanoparticles are comprised of Boron nitride nanotubes.

11. The method of claim 1 wherein said Boron-Nitride nanoparticles are comprised of Boron nitride powder.

* * * * *